(12) United States Patent
Züllig (10) Patent No.: US 6,302,592 B1
(45) Date of Patent: Oct. 16, 2001

(54) CONNECTOR FOR OPTICAL WAVEGUIDES (75) Inventor: Marc-Andrew Züllig, Herisau (CH)

(73) Assignee: Huber & Suhner AG, Herisau (CH)

( * ) Notice: Subject to any disclaimer, the term of this patent is extended or adjusted under 35 U.S.C. 154(b) by 0 days.

(21) Appl. No.: 09/356,737

(22) Filed: Jul. 19, 1999

(30) Foreign Application Priority Data

Jul. 27, 1998 (CH) .................................................. 1583/98

(51) Int. Cl.⁷ .................................................. G02B 6/38
(52) U.S. Cl. .................................................. 385/60; 385/56
(58) Field of Search .............................. 385/53–94, 139

(56) References Cited

U.S. PATENT DOCUMENTS

| | | | | |
|---|---|---|---|---|
| 4,640,575 | * | 2/1987 | Dumas | 385/134 |
| 4,673,242 | | 6/1987 | Logan et al. | |
| 5,348,487 | * | 9/1994 | Marazzi et al. | 439/138 |
| 5,363,460 | * | 11/1994 | Marazzi et al. | 385/70 |
| 5,506,922 | * | 4/1996 | Grois et al. | 385/75 |
| 5,708,745 | * | 1/1998 | Yamaji et al. | 385/92 |
| 5,883,995 | * | 3/1999 | Lu | 385/60 |
| 5,896,477 | * | 4/1999 | Stephenson et al. | 385/53 |
| 5,909,526 | * | 6/1999 | Roth et al. | 385/78 |
| 5,956,444 | * | 9/1999 | Duda et al. | 385/53 |
| 6,041,155 | * | 3/2000 | Anderson et al. | 385/139 |
| 6,081,647 | * | 6/2000 | Roth et al. | 385/139 |
| 6,086,263 | * | 7/2000 | Selli et al. | 385/88 |

FOREIGN PATENT DOCUMENTS

| | | |
|---|---|---|
| 0374136 | 6/1990 | (EP) . |
| 0570652 | 11/1993 | (EP) . |
| 0697607 | 2/1996 | (EP) . |
| 0570652 | 4/1996 | (EP) . |
| 0599784 | 1/1997 | (EP) . |
| 0823649 | 2/1998 | (EP) . |
| 0893716 | 1/1999 | (EP) . |
| 63118707 | 5/1988 | (JP) . |
| 03009308 | 1/1991 | (JP) . |

OTHER PUBLICATIONS

Fiber Optic Connector with Built–in Shutter, XP 000645314, Research Disclosure.

* cited by examiner

*Primary Examiner*—Phan T. H. Palmer
*Assistant Examiner*—Michelle R. Connelly-Cushwa
(74) *Attorney, Agent, or Firm*—Tarolli, Sundheim, Covell, Tummino & Szabo L.L.P.

(57) ABSTRACT

With a connector for optical waveguides, comprising a socket part (10) with an exterior socket housing (11) which is open at least on one side, into which socket housing (11) from the side, of which there is at least one, a connector part with a ferrule encompassing an optical waveguide is pluggable, with a socket (25), open to the side, of which there is at least one, being arranged in the exterior socket housing (11); with said socket, during plugging-in of a connector part, accommodating the associated ferrule by a respective plug-in aperture (25a, b), integrated dust protection is achieved in that hingeably arranged means (39, 41) are provided on the socket part (10), with said means in a first hinging position allowing unrestricted plugging-in of the connector part, and in a second hinging position closing off the socket (25) to the surroundings of the socket part (10) so as to provide a dustproof seal.

6 Claims, 6 Drawing Sheets

CONNECTOR FOR OPTICAL WAVEGUIDES

TECHNICAL FIELD

The present invention relates to the field of optical waveguide technology. It concerns a connector for optical waveguides comprising a socket part with an exterior socket housing which is open at least on one side, into which socket housing from the side, of which there is at least one, a connector part with a ferrule encompassing an optical waveguide is pluggable, with a socket, open to the side, of which there is at least one, being arranged in the exterior socket housing; with said socket, during plugging-in of a connector part accommodating the associated ferrule by a respective plug-in aperture.

Such a connector is known e.g. from the printed publications EP-B1-0 570 652, EP-B1-0 599 784 or EP-A1-0 823 649, with the content of these being expressly considered as forming part of the present application.

STATE OF THE ART

Figure 1:
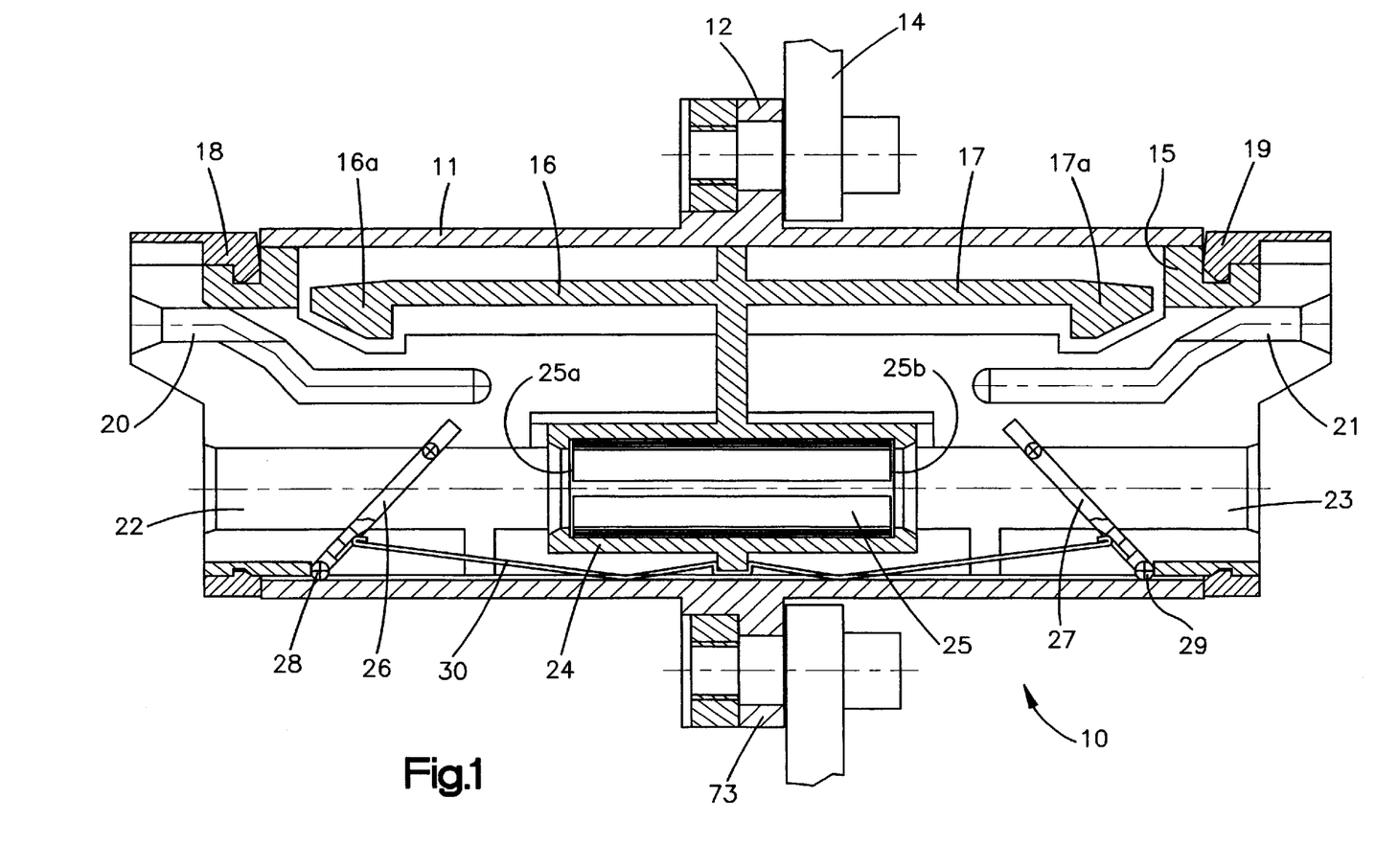
FIG. 1 shows a longitudinal section of a socket part from a connector known from the state of the art with integrated radiation protection flap.

From the printed publications mentioned in the introduction, a connector system for optical waveguides is known where two optical waveguides whose ends are accommodated and fixed in a connector part, can be disconnectably optically coupled by plugging-in the two connector parts into a socket part. FIG. 1 shows a longitudinal section of the socket part of this known connector.

The socket part 10 according to FIG. 1 comprises an elongated exterior socket housing 11, of rectangular cross section, open on two opposing sides, into which an interior socket housing 15 is inserted so as to snap on. On the two sides, the interior socket housing 15 partially protrudes from the exterior socket housing 11. In each instance on the two sides a frame 18, 19 is snapped on to the protruding parts of the interior socket housing 15, with said frame adjoining the exterior socket housing 11. At the top and bottom of the exterior socket housing 11 flanges 12, 13 are formed by means of which flanges the socket part 10 can be attached in the aperture provided for this purpose of a housing wall 14.

On the interior socket housing 15, on the top extending from the middle to the two sides, two sprung tabs 16 and 17 are arranged which at their free ends form a detent pawl 16a or 17a extending inward into the housing. As shown in FIG. 10 of EP-B1-0 570 652, the detent pawls 16a, 17a lock into place after plugging-in a connector part by gripping from behind a stop strip arranged transversely to the connector part, and hold the connector part in the plugged-in position. For the purpose of releasing the lock, an unlocking lever has been provided at the connector part; said unlocking lever enabling the tabs 16 or 17 to be lifted and the detent pawls 16a, 17a to be unlocked as has been explained in the description pertaining to EP-B1-0 570 652.

The actual socket 25 is arranged in the middle of the socket part 10 or in the middle of the interior socket housing 15. The socket 25 is in the shape of a cylinder jacket into which from both sides by means of respective plug-in apertures 25a, b the ferrules of the connector parts to be connected are inserted. The socket 25 which, in contrast to the housing parts 11, 15 which are made of plastic, is usually made of ceramic, is held in a socket mount 24 (made of plastic) which is insertable into the interior socket housing 15 from below. To ensure safe insertion into the plug-in apertures 25a, b of the ferrules, first guide grooves 22, 23 have been provided on the lateral walls of the interior socket housing 15 into which said guide grooves 22, 23 the connector parts are guided by means of matching lateral strips (44 in FIG. 8 of EP-B1-0 570 652).

A connector of the type described requires various protective devices. Firstly, for safety reasons, laser light from the optical waveguides to be connected must be prevented from penetrating to the outside where it could damage the eyes of an observer. Secondly, a safe optical connection between the ends of the two optical waveguides to be connected is ensured only if contamination in the region of the joint, in particular due to dust, is reduced to a minimum.

From U.S. Pat. No. 4,673,242 it is known, in the case of a connector part, to provide a cover to the end of the waveguide which during plugging-in can be pushed back against the force of a spring, to protect the connector part against contamination and to prevent the light beam from penetrating to the outside. By contrast, the associated socket part is unprotected. Furthermore U.S. Pat. No. 4,640,575 describes a cover device for a connector socket which is attached to the housing wall by means of a strap comprising an elastic memory; in the first position the light beam is blocked and in the second position attained after application of force, the socket is closed off from the exterior so as to be dustproof. However, due to the special selection of materials such a protective device is not only expensive to manufacture but above all it uses a lot of space which makes its integration into the actual socket part practically impossible. A further integrated protective device is known from U.S. Pat. No. 4,767,179. In this case, the tab of a thin metal sheet which when the plug connection is undone closes off the plug-in aperture of a socket, is elastically bent inwards by the connector part during plugging-in. The forces occurring in the process can however only be absorbed in that the base surface of the metal sheet is firmly anchored between the socket housing and a printed card situated below it. Such a device is therefore not suitable for a freely protruding socket part according to FIG. 1.

In the case of connectors from the printed publications EP-B1-0 570 652, EP-B1-0 599 784 and EP-A1-0 823 649 mentioned in the introduction, hingeable flaps have been provided with the connector parts, to protect the delicate optical waveguide ends; with said flaps interacting with second guide grooves 20, 21 in the side walls of the interior socket housing 15 and being made to open up by the special arrangement of the second guide grooves 20, 21 (see FIG. 10 of EP-B1-0 570 652). By contrast, in the cited state of the art, no integrated dust protection has been provided for the socket part 10. Within the interior socket housing 15, there exists only a protective device against the leakage of light rays, said protective device comprising two radiation protection flaps 26 and 27 (FIG. 1). By means of matching articulated cams 28, 29, the two protection flaps are hingeably held in the bottom of the interior socket housing 15; they are held in the position shown in FIG. 1 by a mutual two-arm leaf spring 30 inserted into the housing, until such time as they are pushed to the bottom against the spring force by an inserted connector part, thus releasing access to the plug-in apertures 25a, b of the socket 25.

As can be seen from FIG. 1, the radiation protection devices 26, 27, which have significantly smaller dimensions than the plug-in apertures of the interior socket housing 15, merely block the beam path situated in the centre axis of the socket 25. By contrast, dust and dirt can find their way from the exterior, past the radiation protection flaps 26, 27 into the interior of the interior socket housing 15 and thus also into the interior of the socket 25. There they can lodge between the ferrules of two plugged-in connector parts, thus impeding or entirely disconnecting the optical connection.

PRESENTATION OF THE INVENTION

It is thus the object of the invention to provide a connector where the socket part is protected against contamination from the exterior by an integrated protective device which is simple and functionally safe and uses only little space so that it can be integrated in already existing standardised connectors without the dimensions having to be changed.

This object is met by the totality of the characteristics from claim 1.

A first preferred embodiment of the connector according to the invention is characterised in that the means for dust-proof sealing comprise a one-piece closure flap, hingeably arranged on one side at the socket part, with said closing flap in the second hinging position closing off the socket part from the exterior, and with said closing flap being able to be positioned in the first hinging position by hinging it open to the exterior. Such a closure flap can be produced and installed very simply. Because it opens against the direction of plugging-in, it cannot however be operated by the connector part but it must be manually opened separately. By contrast, automatic closure can easily be achieved, e.g. by a spring provided on the outside which pushes the closure flap into the second hinging position after the connector part has been pulled out. Since the hinging region of the closure flap is outside the interior socket housing, it does not require any space in the interior, but as a result, it is somewhat more exposed to possible damage.

In a preferred improvement of this embodiment, the socket part is essentially made of a plastic material, the closure flap is also made of this plastic material, and the closure flap is hinged to the socket part and integrally connected to the socket part by means of a hinge made of this plastic material. The socket part comprises an interior socket housing slidable into the exterior socket housing, in which interior socket housing the socket is accommodated; with the interior socket housing partially protruding from the exterior socket housing towards the side of which there is at least one; with a frame being snapped onto the protruding part of the interior socket housing which frame adjoins the exterior socket housing; and with the closure flap being hinged to the frame. In this way the frame with the closure flap can easily be made as a separate part and the closure flap can easily be installed by snapping it onto the frame.

Another preferred embodiment of the connector according to the invention is characterised in that the means for dust-proof sealing are arranged completely within the interior socket housing and that the socket part comprises an interior socket housing which is slidable into the exterior socket housing in which the socket is accommodated; and that the means for dust-proof sealing are essentially arranged within the interior socket housing. In this way, the means for dust-proof sealing are protected from damage from the exterior, require no additional space towards the exterior, can easily be activated by connector parts to be plugged in, and can easily be installed together with the slide-in interior socket housing, in a dimensionally unchanged exterior socket housing.

Preferably the means for dust-proof sealing comprise two wings which in the region of the plug-in aperture of the socket part on facing sides of the interior socket housing, are arranged so as to be hingeable towards the inside, and which wings in the first hinging position are essentially aligned parallel to the walls of the interior socket housing allowing unrestricted plugging-in of the connector part, and in the second hinging position are swivelled to the centre and abut each other in a central plane of the socket part so as to provide a seal. In this, the wings are held in the second hinging position by spring means, preferably in the form of leaf springs, such that when a connector part is plugged in, they are hinged against the spring force of the spring means into the first hinging position. The separation into two wings allows simplified integration of the sealing means. Likewise, swivelling of the comparatively short wings is facilitated, thus improving their activation by the connector parts and reducing mechanical loads on the hingeable parts.

A first improvement of this embodiment is characterised in that the wings comprise a lower wing and an upper wing; that the centre plane in which the wings abut in the second hinging position is a horizontal plane; that in the interior socket housing a sprung detent pawl for disconnectable locking into place of a plugged in connector part is provided; that the detent pawl is arranged on the exterior of one of the wings, in particular the upper wing; and that the spring means associated with this wing at the same time cause the detent pawl to be sprung. By integrating the detent pawl into one of the wings, there is no need to provide the sprung tabs shaped in a wall of the interior socket housing, as shown in FIG. 1, thus leading to significant simplification of the injection moulding die for the interior socket housing.

A second improvement is characterised in that the wings comprise two lateral wings; that the centre plane in which the wings abut in the second hinging position is a vertical plane; that in the lateral walls of the interior socket housing guide grooves for guiding the connector part during plugging-in are provided; and that the exterior of the lateral wings comprises groove sections which form a section of the guiding grooves when the lateral wings are positioned in the first hinging position. With this type of wing the locking mechanism with the sprung tabs (16, 17 of FIG. 1) positioned at the top, can be retained almost unchanged. The groove sections in the lateral wings ensure that the various guiding grooves remain available for the connector parts, although the lateral wings are swivelled through the planes of the guiding grooves.

Compared to the embodiments mentioned so far, all of which lock the plug-in apertures in the interior socket housing, very direct protection of the socket results if according to a further preferred embodiment the means for dust-proof sealing directly seal off the plug-in aperture of the socket, with the means for dust-proof sealing comprising a flap part which in the second hinging position covers the plug-in aperture of the socket and which by hinging means along a guide shoulder is hingeable into the first hinging position in which the flap part is positioned lateral and parallel to the socket.

If, as shown FIG. 1, in the case of a socket part, within the socket part a radiation protection flap is arranged which during plugging-in of a connector part is lowered against spring resistance, this radiation protection flap can preferably be used as a hinge means for hinging the flap part, with the flap part being hinged to the radiation protection flap via a retaining component. Thus activation of the radiation protection flap by the connector part to be plugged in can be used in a simple way for activating the flap part providing a dust-proof seal.

Further embodiments arise from the dependent claims.

BRIEF EXPLANATION OF THE FIGURES

Below, the invention is illustrated in more detail by means of embodiments in conjunction with the drawing, as follows.

WAYS OF REALISING THE INVENTION

Figure 2:
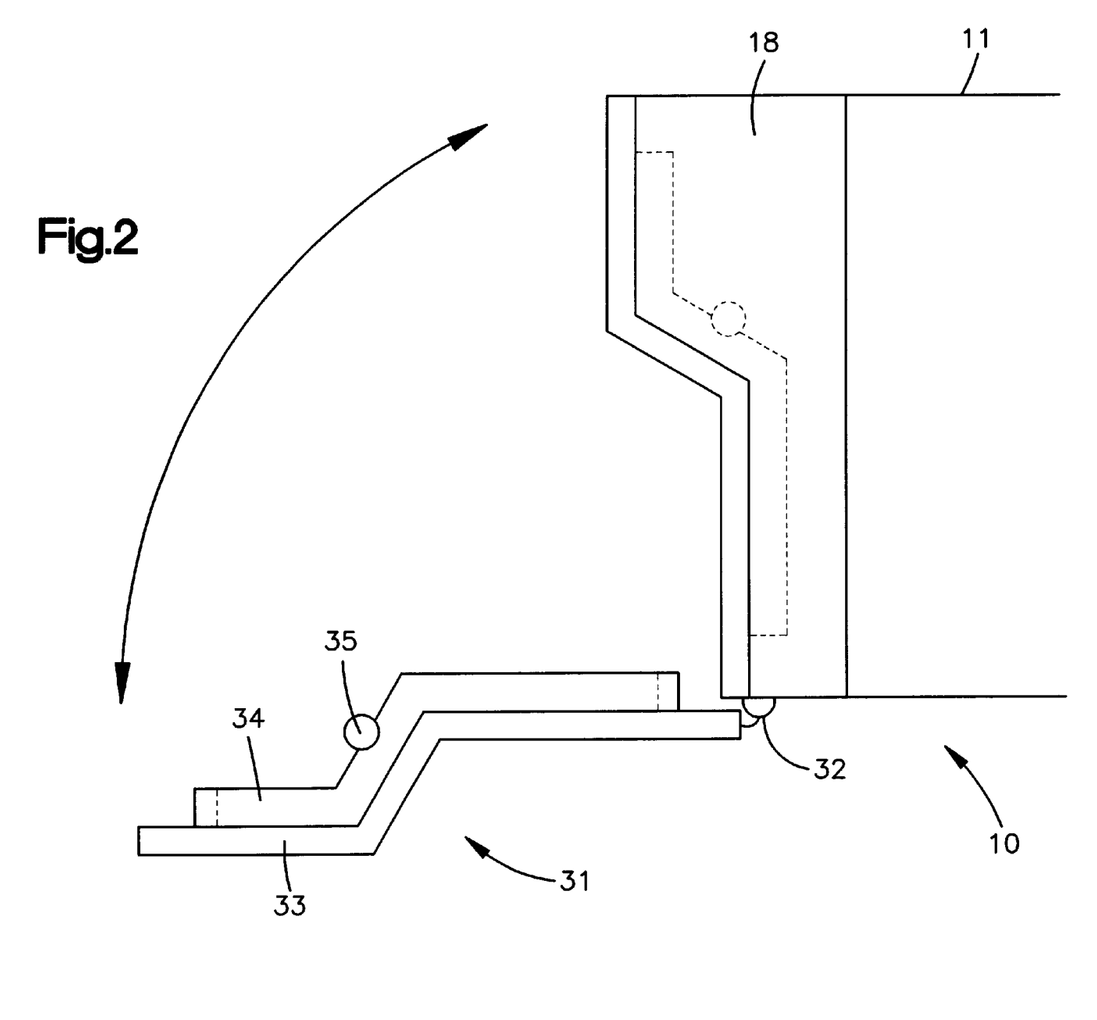
FIG. 2 shows a first embodiment of the connector according to the invention with a one-piece manually operated and outward-hingeable closure flap arranged at the socket part.

FIG. 2 shows a first embodiment of the connector according to the invention with a one-piece manually operated and outward-hingeable closure flap arranged at the socket part. In a simplified sectional view FIG. 1 shows the left extremity of the socket part 10 from FIG. 1 with the exterior socket housing 11 and the snapped open frame 18. At the lower transverse side of this frame 18 a closure flap 31 is hingeably connected. As indicated by the double arrow in FIG. 2, the closure flap 31 can be hinged out, downward into a first hinging position, thus clearing the way for plugging in a connector part (not shown). Preferably a hinge 32, in particular a film hinge, is used for connecting the closure flap 31 to the frame 18. It is in particular advantageous if the frame 18 and the closure flap 31 are made from the same plastic and in one piece in one work step. The hinge 32 is realised as a film hinge in a way which is known per se, in that in the connection area between the closure flap 31 and the frame 18 a thin and thus flexible stay of plastic material is shaped. The closure flap 31 with its step-shaped profile is matched to the respective margin profile of the frame 18. The closure flap 31 comprises a hinged cover 33 on the inside of which a top component 34 protruding upward is shaped. During closure of the hinged cover 31 into the second hinging position, the actual aperture of the socket part 10 is closed off with this top component 34, as indicated in FIG. 2 by the dotted lines within the frame 18. In addition, at the top component 34, a laterally protruding cam 35 can be provided which during closure of the closure flap 31 guides the closure flap within the frame 18, locking it in the closed state.

This embodiment provides the advantage of very easy manufacture and function. The closure flap 31 together with the frame 18 and the hinge 32 can be made in one production process and installed by simple snapping on of the frame. Since the closure flap 31 is arranged outside the exterior socket housing 11, no space within the housing is used for a dust protection device, which can be advantageous in the cramped conditions. In addition, as a result of the integral connection between closure flap 31 and frame 18 by way of hinge 32, the closure flap 31 is connected to the socket part 10 so that it can practically not be lost. However in other respects the closure flap according to FIG. 2 is less favourable. For one, the closure flap 31 has to be manually activated separately, because opening is against the plug-in movement of the connector part so that this plug-in movement cannot be used for activating the closure flap 31. In addition, there is a danger that the closure flap 31 which in its open state protrudes outward, can be damaged or even torn off during everyday use of the connector. Finally, after a connector part has been pulled out from the socket part 10, the flap does not close the aperture automatically, consequently if manual closing is forgotten, dust protection is not effective. However, such automatic closing can be achieved by an additional spring mechanism, e.g. arranged at hinge 32, which, after pulling out the connector part, presses the closure flap 31 into the second hinging position.

Figure 3:
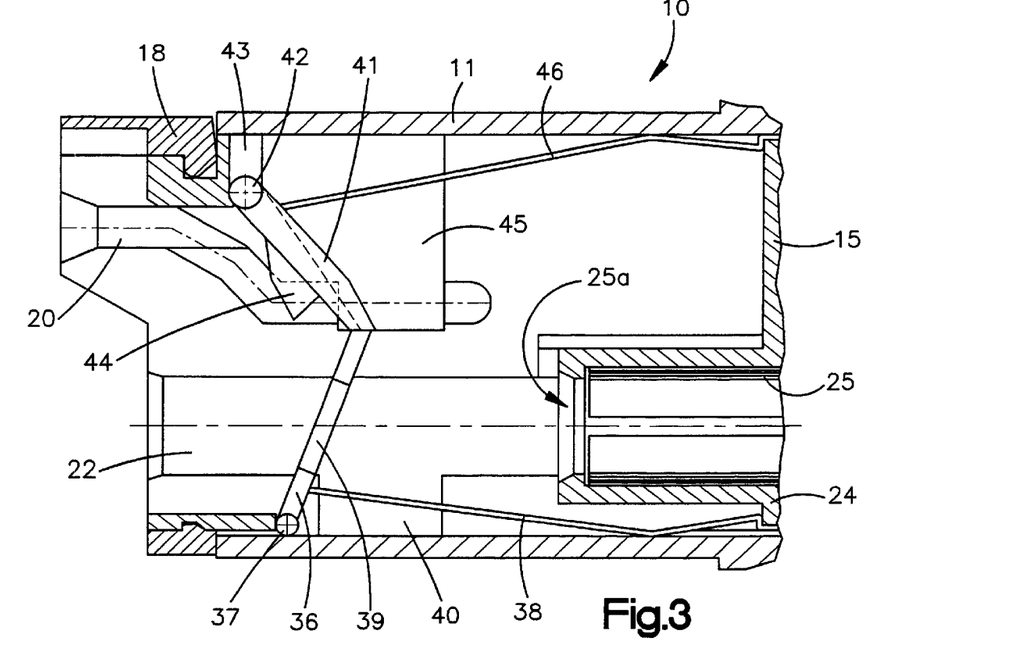
FIG. 3 shows a longitudinal section of one side of a socket part according FIG. 1 with a dust protection device comprising an upper and lower wing according to a second preferred embodiment, in the closed state.
Figure 4:
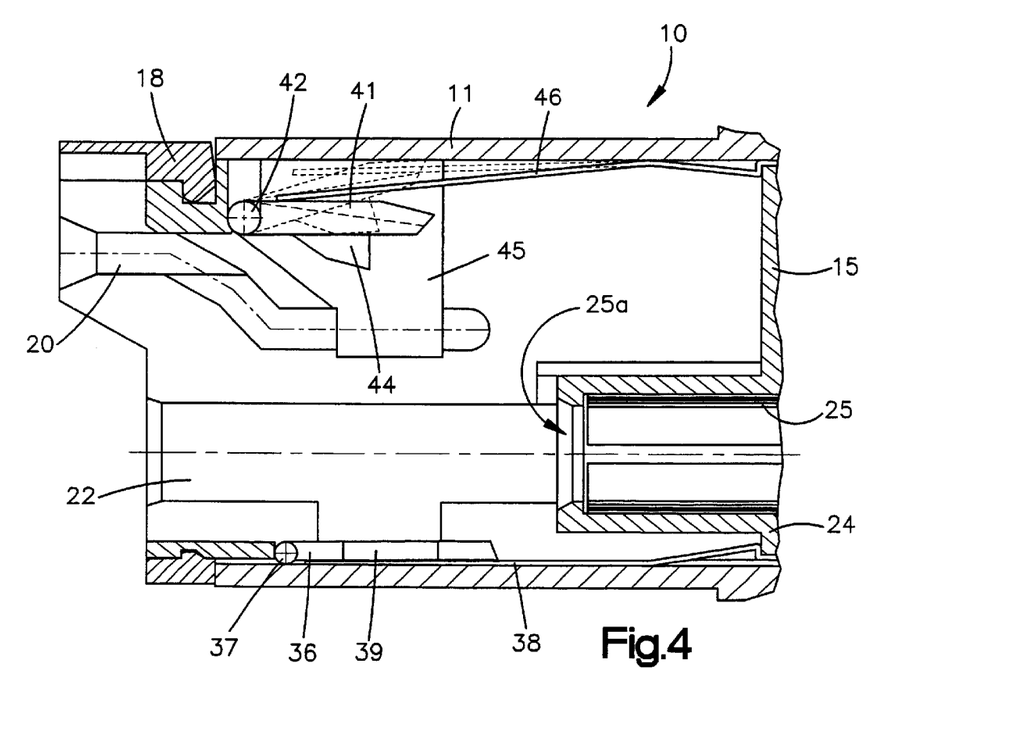
FIG. 4 shows the dust protection device according to FIG. 3 in the open state (without plug-in connector part)

The above problems do not occur with the other embodiments according to FIGS. 3 to 10 which are discussed below. FIGS. 3 and 4 show a first of these other embodiments, with the dust protection device being closed (in a second hinging position) in FIG. 3, and by contrast being shown open (in a first hinging position) in FIG. 4. These Figs. too, are based on the socket part 10, according to FIG. 1, a longitudinal section of whose left half is shown in FIGS. 3 and 4. The reference numbers for various parts correspond to those used in FIG. 1.

In the embodiment shown in FIGS. 3 and 4, the means for dust-proof sealing, i.e. the actual dust protection device, are arranged completely within the socket part 10, in particular within the interior socket housing 15. The dust protection means comprise two (rectangular) wings 36 and 41 which in the region of the plug-in aperture of the socket part 10 are arranged on opposite sides of the interior socket housing 15 so as to hinge inward. In the first hinging position (FIG. 4), the wings 36, 41 are essentially positioned parallel to and close to the walls of the interior socket housing 15. In this way they enable unrestricted plugging-in of the connector part. In the second hinging position (FIG. 3) they are hinged to the middle and with their edges abut in a horizontal centre plane of the socket part 10 so as to provide a seal.

The wings 36, 41 are held in the second hinging position (FIG. 3) by spring means which are preferably in the form of two-armed leaf springs 38 and 46 as shown by reference number 30 in FIG. 1. During plugging-in of a connector part, said wings 36, 41 are then hinged to the first hinging position (FIG. 4) by the connector part, against spring tension of the leaf springs 38, 46. Automatic activation by the connector part is facilitated in that the wings 36, 41 are positioned at an inward angle in the second hinging position. To achieve hingeability of the wings 36, 41, articulated cams 37, 42, protruding on both sides are shaped on their sides, by which cams the wings 36, 41 are inserted in bearing grooves shaped on the walls of the interior socket housing 15. FIG. 3 clearly shows the upper bearing groove 43 for the upper wing 41. Prior to insertion of the interior socket housing 15 into the exterior socket housing 11, the articulated cams 37 or 42 of the wings 36, 41 are inserted in the associated bearing grooves 43. When the housings 15 and 11 are inserted one into the other, the wings 36, 41 are secured against falling out. Respective recesses 40, 45 have been provided in the top and bottom of the wall of the housing, for the wings 36, 41 to be able to be inserted in the interior housing 15 from the exterior.

The lower wing 36 together with the associated leaf spring 38 is of similar design to the radiation protection flap 26 from the known connector according to FIG. 1. While however the radiation protection flap 26 from FIG. 1 does not close off the plug-in aperture in the region of the guide groove 22 because the flap is designed as a single rectangle, on the lower wing 36 laterally protruding projections 39 are shaped on both sides. These projections 39 protrude into the guide groove 22 in the second hinging position (FIG. 3) and cover the plug-in aperture in this region too. The recess 40 is shaped such that when hinging the lower wing downward into the first hinging position (FIG. 4), the lateral projections 39 can be swivelled downward from the guide groove 22 without any restriction.

In the embodiment shown in FIGS. 3 and 4, the upper wing 41 with the associated leaf spring 46 assumes the space which in the known socket part in FIG. 1 is occupied by the sprung tab 16 and its detent pawl 16a. To provide locking of the plugged-in connector part in the socket part despite doing without the sprung tab 16, a detent pawl 44 is shaped to the bottom or exterior of the upper wing 41. With the upper wing 41 in the first hinging position (FIG. 4), said detent pawl 44 occupies the space of the detent pawl 16a in FIG. 1. The interaction between the upper wing 41 and the associated leaf spring 46 has been arranged in such a way that the upper wing 41 can be hinged upward beyond its horizontal position (dotted lines in FIG. 4), against the pressure of the spring. The detent pawl 44 on the underside of the upper wing 41 then clears the way for the connector part to be plugged in and engages with a click behind the transverse locking strip provided on the connector part, as described in the introduction. In this way, the lock-on function in the socket part 10 equipped with dust protection according to FIGS. 3 and 4 can be fully maintained without changing the connector part.

Figure 5:
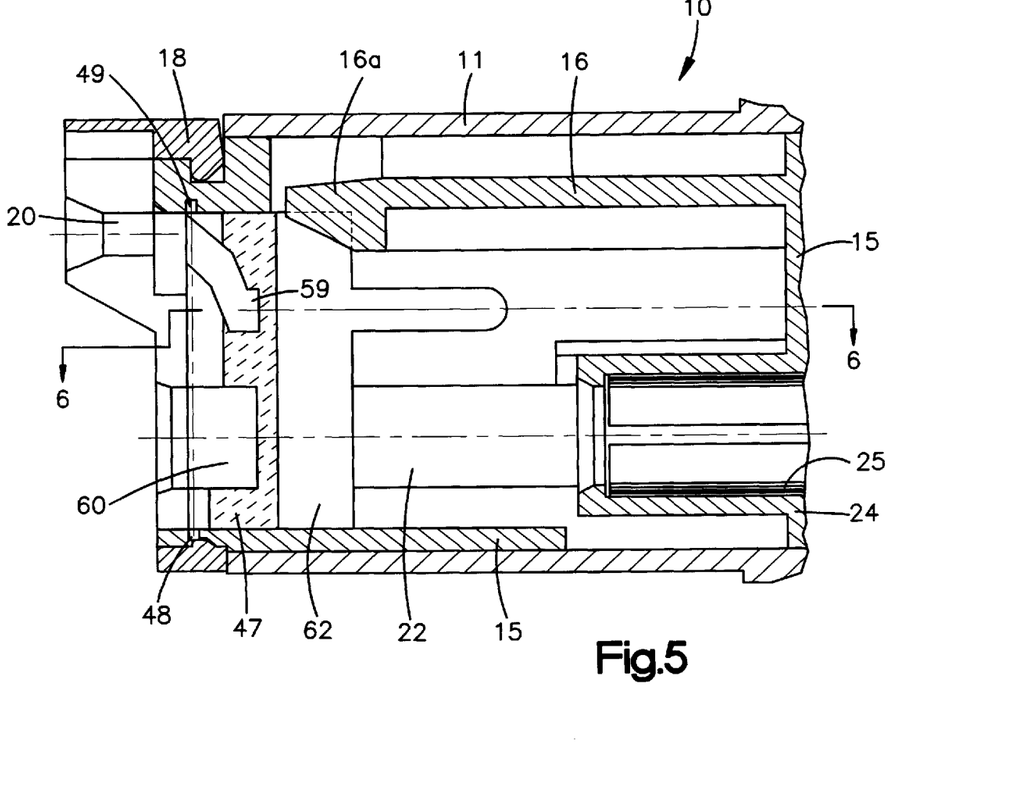
FIG. 5 shows a longitudinal section of one side of a socket part according to FIG. 1 with a dust protection device comprising two lateral wings according to a third preferred embodiment, in the closed state.
Figure 6:
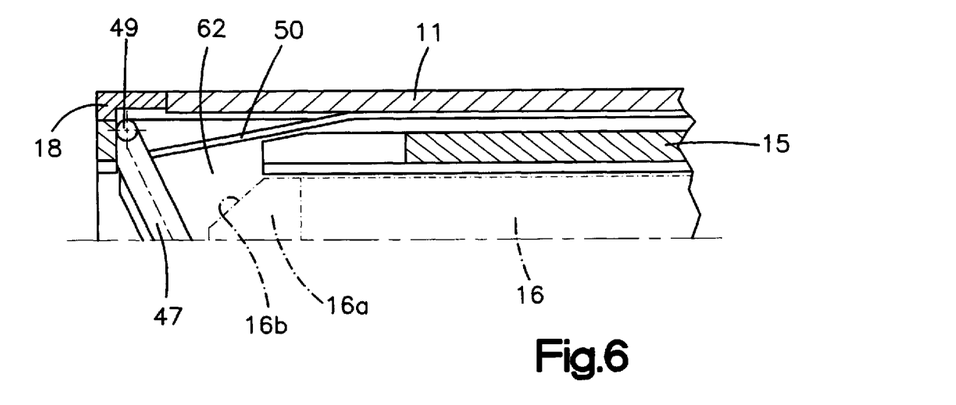
FIG. 6 shows the example from FIG. 5 along the sectional plane VI—VI of FIG. 5.
Figure 7:
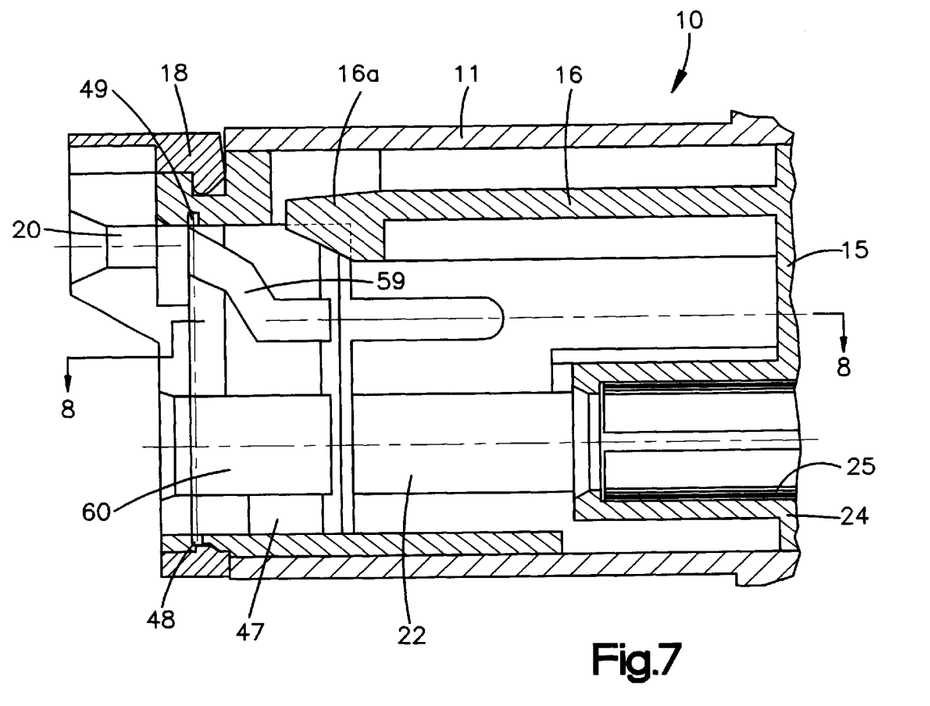
FIG. 7 shows the dust protection device according to FIG. 5 in the open state (without plug-in connector part)

FIGS. 5 to 8 show a further preferred embodiment of the invention which also uses two wings for sealing the plug-in aperture and is also based on a socket part 10 according to FIG. 1. FIGS. 5 and 6 show the second hinging position and FIGS. 7 and 8 the first hinging position, in each case in longitudinal lateral and top view. The Figs. only show one of the lateral wings 47. The other lateral wing (not shown) is arranged axially symmetrically to the vertical centre plane in FIGS. 6 or 8. In contrast to the embodiment of FIGS. 3 and 4, the lateral wings 47—as suggested by their name—are arranged so as to hinge on a vertical axis; they abut in the second hinging position (FIGS. 5 and 6) in a vertical centre plane. For hinging retention an articulated cam 48 or 49 is shaped on the top and bottom of the lateral wings 47. With these articulated cams 48 or 49, the lateral wings 47 are inserted in and laterally held by respective recesses 62 in the lateral walls, in respective bearing grooves in the bottom or in the top of the interior socket housing 15. The lateral wings 47 are also positioned inward at an angle and are pretensioned by an associated leaf spring 50 in the direction towards the second hinging position (FIG. 6).

Figure 8:
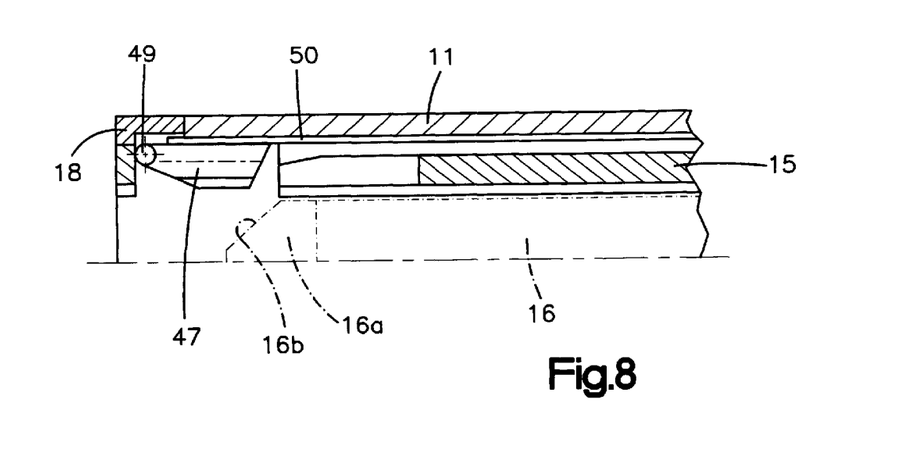
FIG. 8 shows a view of the embodiment from FIG. 7 along the sectional plane VIII—VIII of FIG. 7.

In the first hinging position (FIGS. 7 and 8) the hinged-out lateral wings 47 form part of the lateral wall of the interior socket housing 15. If the above-mentioned guide grooves 20 and 22 have been shaped in the lateral walls, it is advantageous if on the exterior of the lateral wings respective groove sections 59 and 60 have been shaped which with the lateral wings 47 in the first hinging position form a section of the guide grooves 20, 22. In this way the lateral wings 47 can be integrated into the lateral walls of the interior socket housing 15 in a space-saving way, without having to do without uninterrupted guide grooves 20, 22. To provide sufficient space for hinging the lateral wings 47, the frontal region of existing sprung tabs 16 has a bevelled shape 16b (FIG. 6 or 8).

Figure 9:
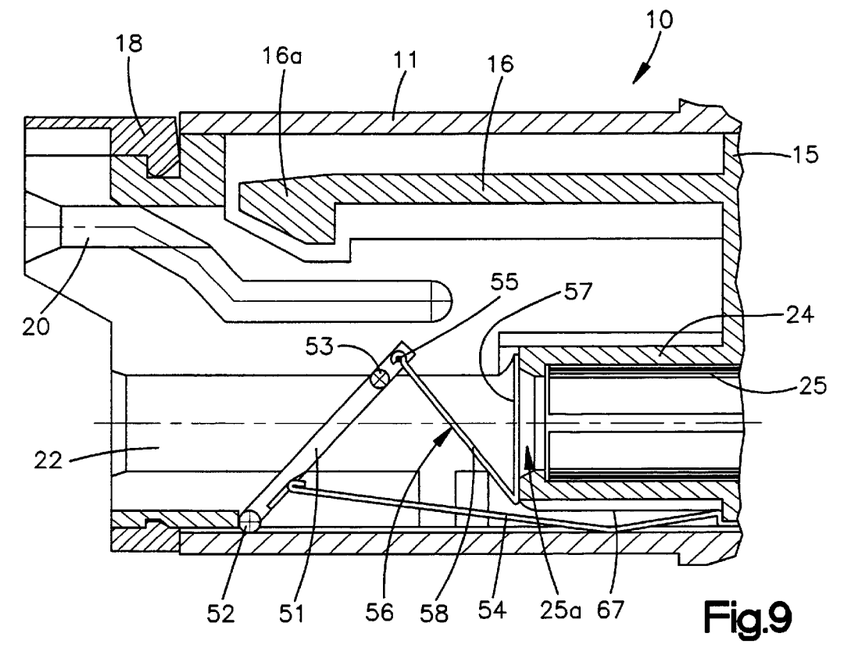
FIG. 9 shows a longitudinal section of one side of a socket part according to FIG. 1 with a dust protection device directly sealing off the socket, according to a fourth preferred embodiment, in the closed state.
Figure 10:
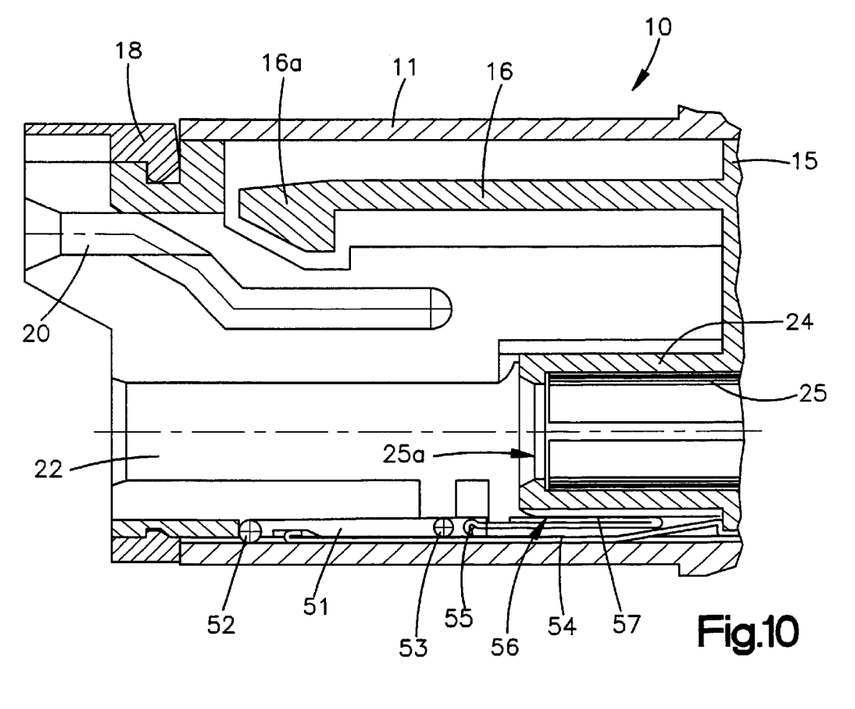
FIG. 10 shows the dust protection device according to FIG. 9 in the opened state (without plug-in connector part).

A further preferred embodiment of the invention, shown in FIGS. 9 and 10, does without sealing the entire socket part 10 but only provides a dust-proof seal for the actual socket 25. Preferably a radiation protection cap 51 according to FIG. 1, hingeably retained by means of articulated cams 52 and pretensioned by a leaf spring 54, is used to realise an automatic hinging mechanism which hinges the protective device from the second hinging position to the first hinging position when a connector is being plugged in. The hinging region is delimited by a stop cam 53 which provides a stop at the upper edge of the guide groove 22 in the position of the radiation protection flap 51 shown in FIG. 9. By means of further laterally protruding articulated cams 55, a V-profile closure element 56 is hingeably connected to the radiation protection flap 51; said closure element comprising an attachment part 58 and the actual flap part 57.

The attachment part 58 encompasses the articulated cams 55 with hook-shaped ends. In the second hinging position (FIG. 9) the flap part 57 closes off the plug-in aperture 25a of the socket 25. If during plugging-in of a connector part the radiation protection flap 51 (which in this embodiment no longer has a real radiation protection function, due to the existing flap part 57) is pushed downward against the force of the leaf spring 54, the flap part 57 is hinged over the retaining component 58 away from the plug-in aperture 25a under the socket 25 into the first hinging position (FIG. 10), with flap part 57 and retaining component 58 being hinged together. In order to guide the flap part 57, below the socket 25 a guide shoulder 61, rounded in the frontal region, is provided. Obviously, the closure element 56 must be produced from a material in such a way that during transition from the second to the first hinging position it hinges together elastically. It is imaginable that the closure element is made of a sprung metal sheet or a suitable plastic material. The embodiment according to FIGS. 9 and 10 has the advantage that already existing socket parts with radiation protection flaps according to FIG. 1 can very simply be retrofitted and provided with a dust protection device.

LIST OF REFERENCES

10 Socket part
11 Exterior socket housing
12, 13 Flange
14 Housing wall
15 Interior socket housing (housing insert)
16, 17 Sprung tab
16a, 17a Detent pawl
16b Bevelled shape
18, 19 Frame (can be snapped open)
20, 21 Guide groove (connector cap)
22, 23 Guide groove (connector)
24 Socket mount
25 Socket
25a, b Plug-in aperture (socket)
26, 27, 51 Radiation protection flap
28, 29, 52 Articulated cam
30, 54 Leaf spring (two-arm)
31 Closure flap
32 Hinge
33 Hinged cover
34 Top component
35 Cam
36 Lower wing
37, 42 Articulated cam 38 Leaf spring
39 Projection
40 Recess
41 Upper wing
43 Bearing groove
44 Detent pawl
45, 62 Recess
46, 50 Leaf spring
47 Lateral wing
48, 49, 55 Articulated cam
53 Stop cam
56 Closure element (V-shaped)
57 Flap part (closure element)
58 Retaining component (closure element)
59, 60 Groove section
61 Guide shoulder

What is claimed is:

1. A connector for optical waveguides comprising:
a socket part (10) including an exterior socket housing (11) defining a chamber and having at least one side with an opening into said chamber;
a connector part connected to a waveguide and for insertion into said opening, said connector part including a ferrule;
a socket (25) located in said chamber in said exterior socket housing (11) for receiving said ferrule;
said socket (25) including an aperture (25a, 25b) located at one side of said socket;
said aperture receiving said ferrule upon insertion said connector part into said opening;
hinging means (31, 39, 41, 47, 57) located on said socket part (10), said hinging means in a first hinging position allowing unrestricted insertion of said connector part into said opening, said hinging means in a second hinging position sealing off said socket (25) to the surrounding socket part (10) to provide a dustproof seal;
said hinging means (31, 39, 41, 47, 57) being located completely within said socket part (10);
said socket part (10) further including an interior socket housing (15) slidable into said chamber in said exterior socket housing (11), said socket (25) being located in said interior socket housing, (15) said hinging means (31, 39, 41, 47, 57) being located within said interior socket housing (15);
said hinging means including two wings (36, 41, 47) which in the region of said aperture (25a, 25b) of the socket (25) on facing sides of said interior socket housing (15) are located so as to be hingeable towards an inside of said interior socket housing, said wings in said first hinging position are essentially aligned parallel to walls of said interior socket housing (15) allowing unrestricted insertion of said connector part, said wings in said second hinging position are swiveled to a center and abut each other in a central plane of said socket part (10);
said wings (36, 41, 47) being held in said second hinging position by spring means (38, 46, 50) such that when said connector is connected to said opening, said wings are hinged against a spring force of said spring means (38, 46, 50) into said first hinging position;
said wings including a lower wing (36) and an upper wing (41), said center plane in which said wings (36, 41) abut in said second hinging position is a horizontal plane; and a sprung detent pawl (44) for disconnectable locking into plane of an inserted connector part;
said detent pawl (44) being located in said interior said socket housing (15) on an exterior of said upper wing (41), said spring means (46) associated with said upper wing (41) at the same time causing said detent pawl (44) to be sprung.

2. A connector for optical waveguides comprising:
a socket part (10) including an exterior socket housing defining a chamber and (11) having at least one side with an opening into said chamber;
a connector part connected to a waveguide and for insertion into said opening, said connector part including a ferrule;
a socket (25) located in said chamber in said exterior socket housing (11) for receiving said ferrule;
said socket (25) including an aperture (25a, 25b) located at one side of said socket;
said aperture receiving said ferrule upon insertion said connector part into said opening;
hinging means (31, 39, 41, 47, 57) located on said socket part (10), said hinging means in a first hinging position allowing unrestricted insertion of said connector part into said opening, said hinging means in a second hinging position sealing off said socket (25) to the surrounding socket part (10) to provide a dustproof seal;
said hinging means (31, 39, 41, 47, 57) being located completely within said socket part (10);
said socket part (10) further including an interior socket housing (15) slidable into said chamber in said exterior socket housing (11);
said socket (25) being located in said interior socket housing (15), said hinging means (31, 39, 41, 47, 57) being located within said interior socket housing (15);
said hinging means including two wings (36, 41, 47) which in the region of said aperture (25a, 25b) of the socket (25) on facing sides of said interior socket housing (15) are located so as to be hingeable towards an inside of said interior socket housing, said wings in said first hinging position are essentially aligned to walls of said interior socket housing (15) allowing unrestricted insertion of said connector part, said wings in said second hinging position are swiveled to a center and abut each other in a center plane of said socket part (10);
said wings (36, 41, 47) being held in said second hinging position by spring means (38, 46, 50) such that when said connector is connected to said opening, said wings are hinged against the spring force of said spring means (38, 46, 50) into said first hinging position;
said wings including two lateral wings (47), said center plane in which the wings (47) abut in said second hinging position is a vertical plane; and
guide grooves (20, 22) for guiding the connector part during insertion into said opening are located in said two lateral walls of said interior socket housing (15), said exterior of said lateral wings (47) including groove sections (59, 60) which form a section of said guide grooves (20, 22) when said lateral wings (47) are in said first hinging position.

3. A connector for optical waveguides comprising:
a socket part (10) including an exterior socket housing (11) defining a chamber and having at least one side with an opening into said chamber;

a connector part connected to a waveguide and for insertion into said opening, said connector part including a ferrule;

a socket (25) located in said chamber in said exterior socket housing (11) for receiving said ferrule;

said socket (25) including an aperture (25a, 25b) located at one side of said socket;

said aperture receiving said ferrule upon insertion said connector part into said opening;

hinging means (31, 39, 41, 47, 57) located on said socket part (10), said hinging means in a first hinging position allowing unrestricted insertion of said connector part into said opening, said hinging means in a second hinging position sealing off said socket (25) to the surrounding socket part (10) to provide a dustproof seal;

said hinging means (31, 39, 41, 47, 57) being located completely within said socket part (10);

said hinging means (56, 57, 58) engaging said socket (25) and directly closing said aperture (25a, 25b) of said socket (25).

4. A connector according to claim 3, wherein said hinging means includes a flap part (57) which in said second hinging position covers said aperture (25a) of said socket (25); with said flap part (57) being hingeable by swivel means (51, 52, 54, 55, 58) along a guide shoulder (61) into the first hinging position in which said flap part (57) is positioned lateral and parallel to said socket (25).

5. A connector according to claim 4, wherein a radiation protection flap (51) is located within said socket part (10) which during insertion of said connector part is lowered against spring resistance; said radiation protection flap (51) being used as a hinge means for hinging said flap part (57); said flap part (57) being hinged to said radiation protection flap (51) via a retaining component (58).

6. A connector according to claim 3 wherein said socket part (10) is configured for opposite insertion of two connector parts on opposing sides, said hingeably arranged means (31, 39, 41, 47, 57) being located at each of said opposing sides of said socket part (10).

* * * * *